(12) United States Patent
Määttä

(10) Patent No.: US 7,551,148 B2
(45) Date of Patent: Jun. 23, 2009

(54) EXTENDED DISPLAY DEVICE

(75) Inventor: Esa Määttä, Viiala (FI)

(73) Assignee: Nokia Corporation, Espoo (FI)

( * ) Notice: Subject to any disclaimer, the term of this patent is extended or adjusted under 35 U.S.C. 154(b) by 682 days.

(21) Appl. No.: 11/031,470

(22) Filed: Jan. 6, 2005

(65) Prior Publication Data
US 2006/0145942 A1 Jul. 6, 2006

(51) Int. Cl.
*G09G 5/00* (2006.01)
(52) U.S. Cl. ........................................ 345/1.3
(58) Field of Classification Search ............. 345/1.1–5, 345/9, 32, 108; 359/619
See application file for complete search history.

(56) References Cited
U.S. PATENT DOCUMENTS 6,486,890 B1 11/2002 Harada et al.
6,504,649 B1 * 1/2003 Myers .................... 359/619
6,577,496 B1 * 6/2003 Gioscia et al. ............... 345/156
2003/0231144 A1 * 12/2003 Cho et al. .................... 345/1.3

FOREIGN PATENT DOCUMENTS

WO WO2004/036297 A1 4/2004

* cited by examiner

*Primary Examiner*—Chanh Nguyen
*Assistant Examiner*—Adam J Snyder
(74) *Attorney, Agent, or Firm*—Ware, Fressola, Van Der Sluys & Adolphson LLP

(57) ABSTRACT

A large undivided image may be displayed by combining primary images displayed by two or more display units. Due to inactive edge regions of the display units, there is a gap between the primary images. To eliminate the gap, the paths of light rays transmitted from the display units are shifted and/or bent to form secondary images based on said primary images. Paths of light rays transmitted from a single display unit are shifted and/or bent substantially in only one direction. Consequently, the secondary images are shifted with respect to said primary images such that a gap between said secondary images is substantially eliminated. Advantageously, the secondary images are formed using an element comprising a plurality of linear and parallel prisms which have equal prism angles.

29 Claims, 14 Drawing Sheets

EXTENDED DISPLAY DEVICE

FIELD OF THE INVENTION

The present invention relates to a device to display an image. The present invention relates also to a method to display an image.

BACKGROUND OF THE INVENTION

Typically, an image-forming active region of a display unit is smaller than the physical size of the display unit. For example, a liquid crystal display comprises typically an inactive edge region of a few millimeters. The inactive edge region exists e.g. due to reasons related to mechanical construction, strength and sealing.

It may be desired that a foldable device would be capable of displaying an image which is larger than the device in its folded state. The maximum size of the displayed image is typically limited by the size of the undivided active region of a display unit, which in turn is limited by the size of the device in its folded state.

Images formed by two or more display units may be combined to form a larger image. However, the combined image is typically divided due to the inactive edge regions of the display units. Thus, the visual appearance of the image may not be satisfactory.

U.S. Pat. No. 6,486,890 discloses an apparatus for displaying images, said apparatus comprising two adjacent display screens and two magnifying lenses arranged in front of said displays in the viewing direction. The lenses are positioned at a distance upwards of the display screens such that magnified virtual images formed by the lenses are displayed without a gap between them, said virtual images constituting a larger undivided image.

Patent publication WO2004/036297A1 discloses a cover arrangement overlaying a display screen and comprising a generally planar portion and an edge portion, the latter comprising further a light-bending region. The light-bending region provides graded magnification that optimizes the viewing across a junction between display screens that have been arranged adjacent to each other.

The aforementioned prior art solutions for providing a combined image rely on altering significantly the magnification of the view in the neighborhood of the edges of the separate adjacent displays. This causes a need to manufacture optical overlay components that have graded local magnification properties, i.e. the provided magnification is different in different parts of said components. This not only complicates the manufacturing of such components, but also creates a need to have them accurately positioned with respect to the display screens.

SUMMARY OF THE INVENTION

The object of the present invention is to display a substantially undivided image by combining together images displayed by two or more display units.

According to a first aspect of the invention, there is provided a display device for displaying an image, comprising at least:

a first display unit having a first active region to display a first primary image,
a second display unit having a second active region to display a second primary image, said second active region and first active region being adjacent to each other but having a gap between them, and
an image merging element adapted to form a first secondary image based on said first primary image and a second secondary image based on said second primary image, wherein said image merging element comprises at least a first image shifting element adapted to shift and/or bend paths of light rays originating from said first primary image substantially in a first direction only in order to change, typically decrease, a visual distance between said first secondary image and said second secondary image.

According to a second aspect of the invention, there is provided a display device for displaying an image, comprising at least:

a first display unit comprising a first active region to display a first primary image,
a second display unit comprising a second active region to display a second primary image, said second active region and first active region being adjacent to each other but having a gap between them, and
an image merging element adapted to form a first secondary image based on said first primary image and a second secondary image based on said second primary image, said image merging element comprising a plurality of substantially linear and parallel prisms, the prism angles of said prisms being substantially equal.

According to a third aspect of the invention, there is provided a mobile device comprising a display device for displaying an image, said display device in turn comprising at least:

a first display unit having a first active region to display a first primary image,
a second display unit having a second active region to display a second primary image, said second active region and first active region being adjacent to each other but having a gap between them, and
an image merging element adapted to form a first secondary image based on said first primary image and a second secondary image based on said second primary image, wherein said image merging element comprises at least
a first image shifting element adapted to shift and/or bend paths of light rays originating from said first primary image substantially in a first direction only in order to change, typically decrease, a visual distance between said first secondary image and said second secondary image, and
a second image shifting element adapted to shift paths of light rays originating from said second primary image substantially in a second direction only in order to change, typically decrease, a visual distance between said first secondary image and said second secondary image, said second direction being substantially opposite to said first direction.

According to a fourth aspect of the invention there is provided a method to display an image, said method comprising at least:

transmitting light rays from a first active region of a first display unit to display a first primary image,
transmitting light rays from a second active region of a second display unit to display a second primary image, said second active region and first active region being adjacent to each other but having a gap between them,
using an image merging element to form a first secondary image based on said first primary image and a second secondary image based on said second primary image, said image merging element comprising at least a first image merging element, and
shifting and/or bending paths of the light rays originating from said first primary image substantially in only a first direction by said first image shifting element in order to change, typically decrease; a visual distance between said first secondary image and said second secondary image.

According to a fifth aspect of the invention there is provided a method to display an image, said method comprising at least:

transmitting light rays from a first active region of a first display unit to display a first primary image, displaying a second primary image by a second active region of a second display unit, and bending paths of said light rays using a plurality of prisms to form a first secondary image based on said primary image.

Two primary images are displayed by two or more separate but adjacent display units. Due to inactive edge regions of the display units, there is a gap between the primary images. To eliminate the disturbing visual effect of this gap, the paths of light rays transmitted from the display units are shifted and/or bent to form secondary images based on said primary images. According to the invention, the paths of light rays transmitted from a single display unit are shifted and/or bent substantially in only one lateral direction, and this shifting and/or bending is arranged to take place substantially without locally altering the magnification of the primary image. Also, the shifting and/or bending effect is arranged to take place substantially over the whole area of the display unit. Consequently, either one or both of the secondary images are shifted with respect to their primary images in such a way that a gap between the corresponding secondary images is substantially eliminated. Thus, the secondary images constitute a larger and substantially undivided image.

Deviating from prior art solutions, the invention proposes a solution where the magnification over the primary image area is not altered locally, but it is maintained substantially constant i.e. homogeneous over the whole image area. Instead, the image is merely shifted laterally without necessarily altering the net magnification at all.

According to the invention it is possible to shift only one of the primary images or to have them all shifted with respect to each other either towards each other, or even further off from each other, if desired.

According to one embodiment of the invention, the shifting is effected by using a homogenous and economical micro prism sheet as the image shifting element, said micro prism sheet comprising a plurality of identical, linear and parallel microscopic prisms having an equal prism angle.

The benefits of the invention over prior art solutions are significant. The image quality is maintained better, because there is substantially no variation of the local image magnification. The use of image shifting elements that are both optically homogeneous substantially over their whole area provides clear manufacturing benefits and also relaxes positioning accuracy requirements upon assembly. The image shifting elements can be manufactured to be thin and inexpensive. The latter benefits are crucial in those applications, where the invention is used in mobile devices.

The embodiments of the invention and their benefits will become more apparent to a person skilled in the art through the description and examples given herein below, and also through the appended claims.

BRIEF DESCRIPTION OF THE DRAWINGS

In the following examples, the embodiments of the invention will be described in more detail with reference to the appended drawings, in which.

DETAILED DESCRIPTION

Figure 1:
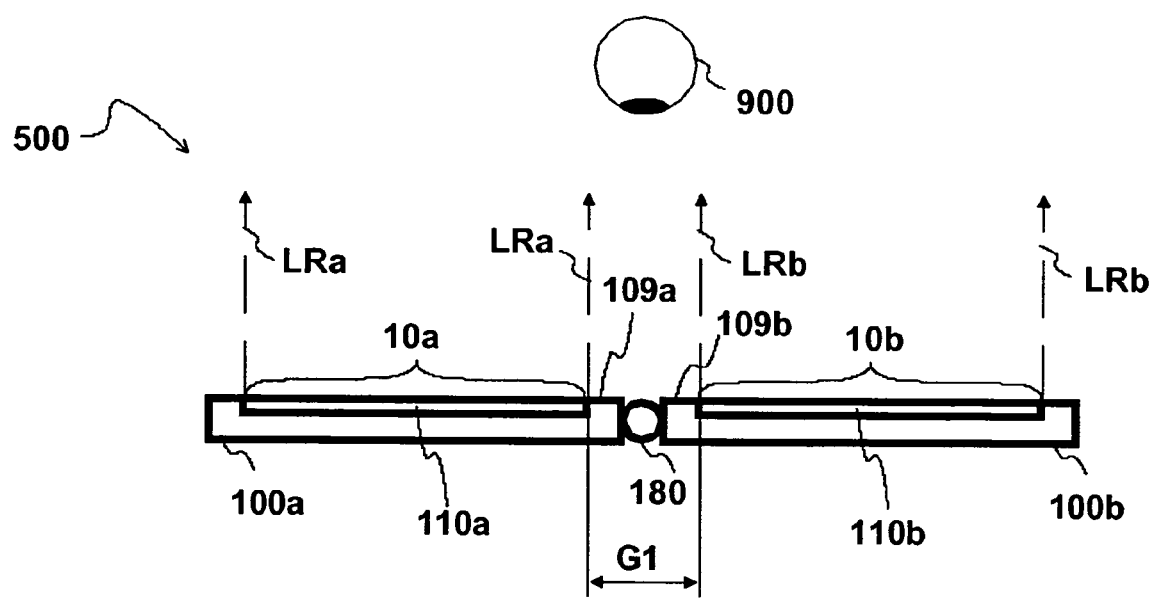
FIG. 1 shows schematically a side view of a display device comprising two display units.

Referring to FIG. 1, a display device 500 may comprise a first display unit 100a and a second display unit 100b. The first display unit 100a comprises a first active region 110a to display a first primary image 10a. The second display unit 100b comprises a second active region 110b to display a second primary image 10b. The active regions 110a and 110b transmit light rays LRa, LRb to the eye 900 of an observer.

The dimensions of the first active region 110a define the maximum dimensions of a first primary image 10a which can be displayed by the first active region 110a. The dimensions of the second active region 110b define the maximum dimensions of a second primary image 10b which can be displayed by the second active region 110b.

The display units 100a, 100b comprise inactive edge regions 109a and 109b. The display units 100a, 100b may be coupled together by a hinge 180, which enables folding of the display device 500. There is a gap between the primary images 10a, 10b due to the hinge 180 and the inactive regions 109a, 109b. The width of the gap is G1.

Figure 2:
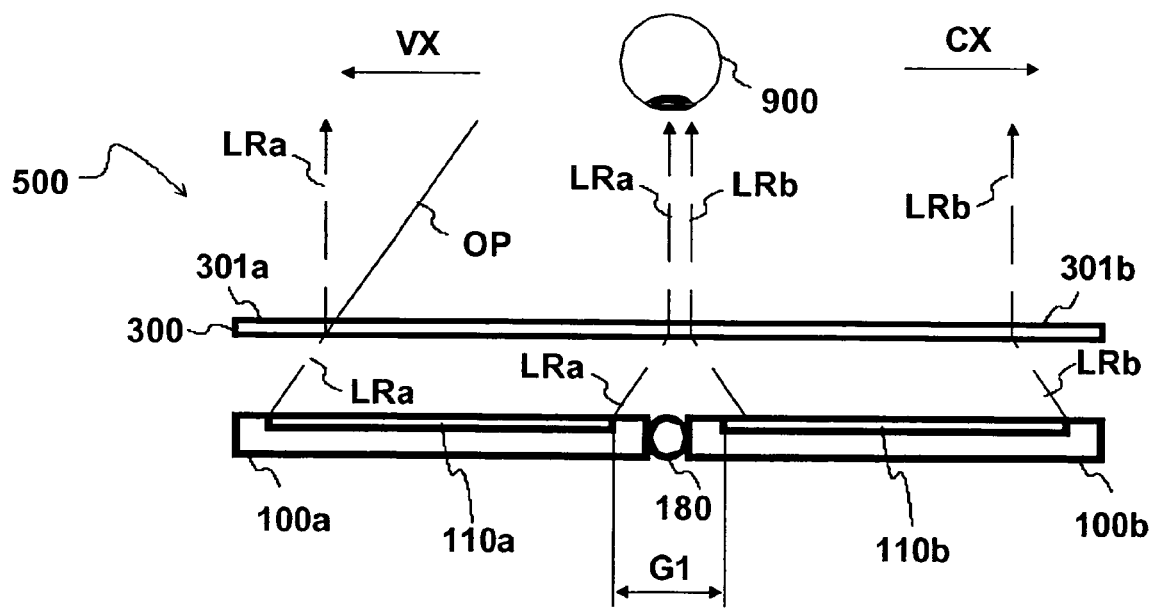
FIG. 2 shows schematically a side view of a display device comprising two image shifting elements.

Referring to FIG. 2, the display device 500 according to the present invention comprises an image merging element 300. The image merging element 300 comprises at least a first image shifting element 301a. Advantageously, the image merging element 300 comprises also a second image shifting element 301b.

The first active region 110a is adapted to transmit light, i.e. light rays LRa, through the first image shifting element 301a. The image shifting element 301a modifies the paths of the light rays LRa such that the eye 900 of the observer perceives a first secondary image 20a (see FIG. 3b) which is shifted with respect to the first primary image 10a (see FIGS. 3a and 3b).

The first image shifting element 301a is adapted to bend the light rays LRa with respect to their original line of propagation OP, in a direction VX. The direction VX is parallel to the plane of the first image shifting element 301a. The light rays LRa are not bent in such a way that they are parallel to the plane of the first image shifting element 301a after bending. Further, the direction VX deviates substantially from the normal of the first image shifting element 301a. Advantageously, the direction VX is defined by a vector drawn from the center of the second active region 110b to the center of the first active region 110a.

The second active region 110b is adapted to transmit light rays LRb, through the second image shifting element 301b. The second image shifting element 301b is adapted to bend the light rays LRb in a direction CX. The light rays LRb are not parallel to the direction CX after bending. Advantageously, the direction CX is substantially opposite to the direction VX.

Figure 3A:
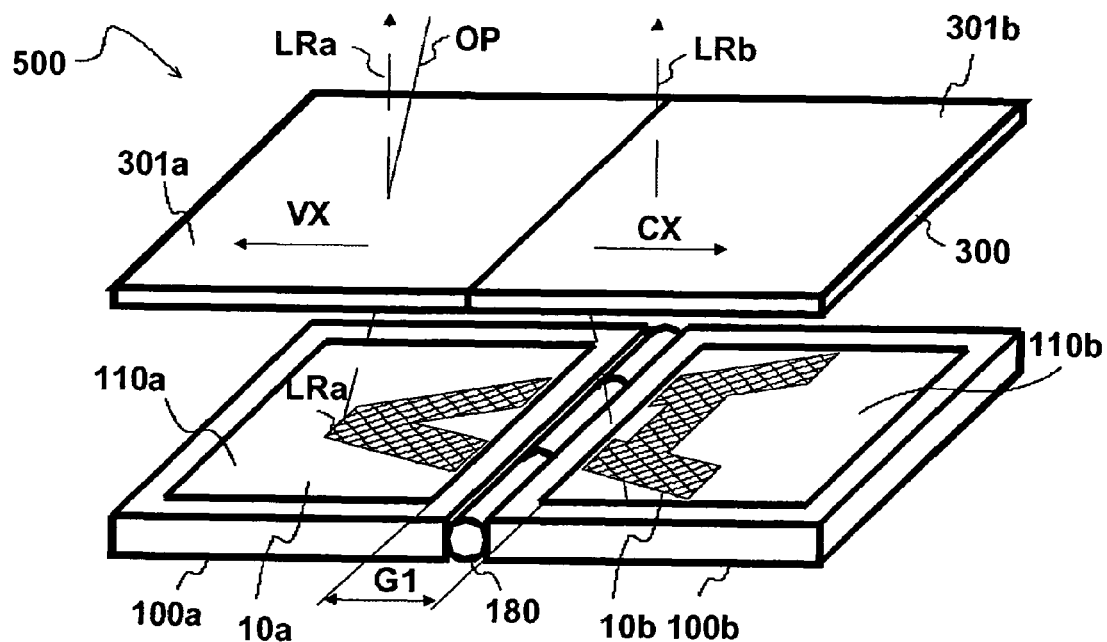
FIG. 3a shows schematically a three dimensional view of a display device comprising two image shifting elements.

Referring to FIG. 3a, the first active region 110a of the first display unit 100a forms a first primary image 10a. The second active region 110b of the second display unit 100b forms a second primary image 10b. The primary images 10a, 10b shown in FIG. 3a are halves of the letter "A". The distance between the primary images 10a, 10b is equal to or greater than G1.

The first image shifting element 301a is adapted to bend light rays LRa in the direction VX, to deviate from their original line of propagation OP. The light rays LRb are bent in the opposite direction CX by the second image shifting element 301b.

Figure 3B:
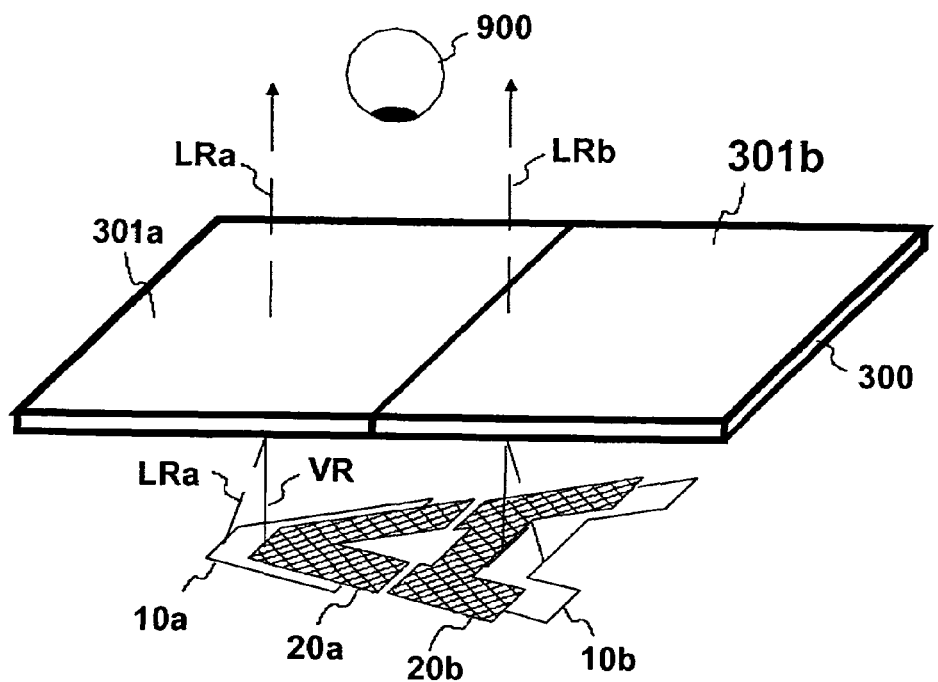
FIG. 3b shows schematically secondary images formed by image shifting elements.

Referring to FIG. 3b, the image shifting element 300 modifies the path of the light rays LRa, LRB transmitted from the active regions 110a, 110b such that an observer perceives a first secondary image 20a which is substantially near the second secondary image 20b. The distance between the secondary images 20a, 20b is substantially smaller than G1, and advantageously equal to zero.

The observer interprets light rays LRa, LRb to propagate in a linear fashion. For example, a light ray LRa appears to originate from a point in a line VR, the line VR being parallel to the path of the ray LRa after bending. The plurality of bent light rays LRa correspond to the first secondary image 20a, which is shifted with respect to the first primary image 10a. The secondary image 20a is a virtual image.

The second image shifting element 301b is also adapted to bend light rays LRb such that they correspond to the second primary image 20b.

The distance between the primary images 10, 10b may be optimized for a typical distance between the eye 900 of the observer and a handheld device. The distance between the first primary image 10a and the second primary image 10b on the displays may also be adjusted by software means to eliminate a gap between the secondary images 20a, 20b. Such an adjustment may be required for example when a distance between the eye 900 and the display device 500 is changed.

When the width G1 is too small, the displayed first secondary image 20a and the second secondary image 20b may partly overlap, which is an undesired situation.

Figure 3C:
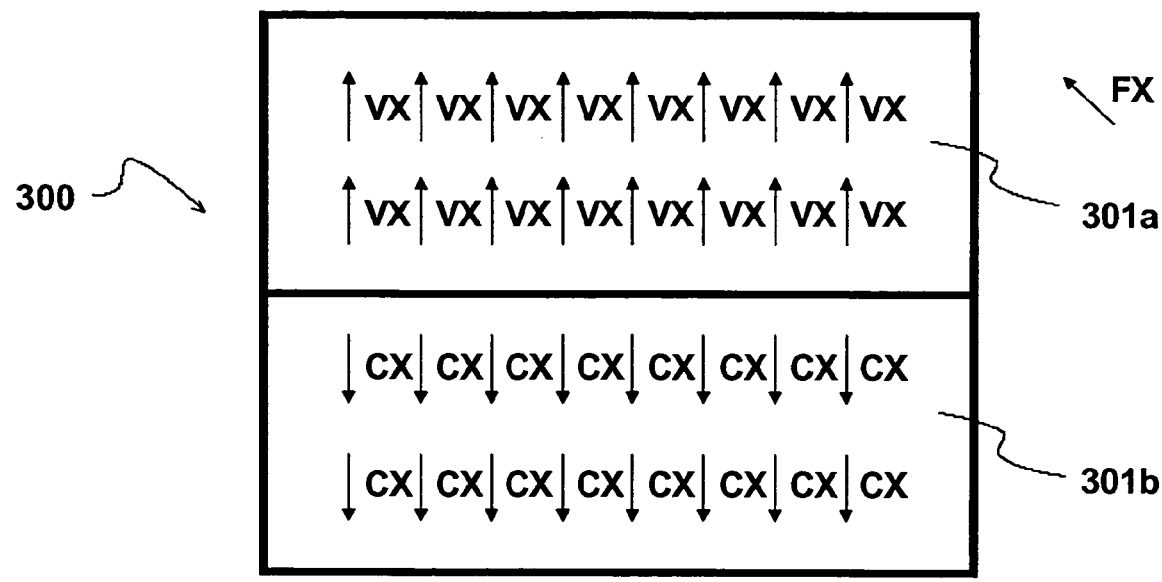
FIG. 3c shows schematically from a top view bending of light rays by the image shifting elements.

Referring to FIG. 3c, substantially the entire area of the first image shifting element 301a is adapted to bend light rays LRa in the direction VX, which means that substantially no portion of the image shifting element 301a is adapted to bend light rays LRa in any direction deviating from the direction VX. For example, substantially no portion of the image shifting element 301a bends light rays in the direction FX.

If such regions exist which bend light in some other direction than VX, they do not belong to the image shifting element 301a.

Substantially the entire area of the second image shifting element 301b is adapted to bend light rays LRb in the direction CX, which means that substantially no portion of the image shifting element 301a is adapted to bend light rays in any direction deviating from the direction CX.

In one embodiment of the invention there is an angle between the first display unit 100a and the first image shifting element 301a. Therefore the projected area of light rays LRa originating from the first active region 110a and transmitted through the first image shifting element 301a is substantially smaller than the area of the first active region 110a.

The angle between the first display unit 100a and the first image shifting element 301a should be smaller than 60 degrees. Further, the area of the first image shifting element 301a should be at least 51% of the area of the first active region 110a of the first display unit 100a. Further, the area of the second image shifting element 301b should be at least 51% of the area of the first active region 110b of the first display unit 100b, respectively. Thus, the display device 500 may display a combined image which is larger than the first primary image 10a.

Advantageously, the active regions 110a, 110b and the image shifting elements 301a, 301b are rectangular.

Deviating from prior art solutions, the substantially entire area of the first and second image shifting elements 301a, 301b is adapted to bend the light rays LRa, LRb and there is no change in the local optical magnification between various points of the image shifting elements. In other words, the magnification of the image shifting elements does not exhibit any local change when approaching the edges of the elements. Preferably, an image shifting element comprises periodically replicated substantially identical microstructures over the whole area of the image shifting element.

Figure 4A:
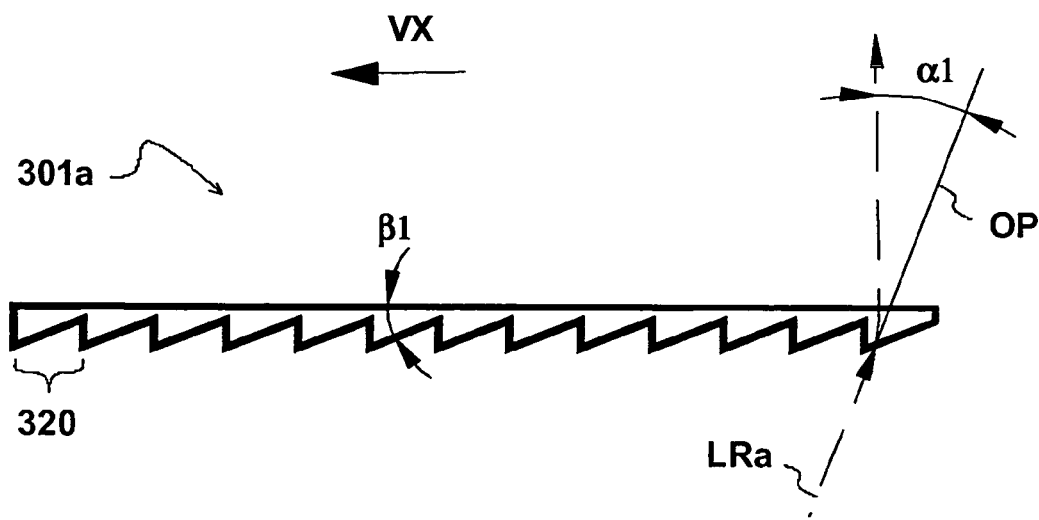
FIG. 4a shows schematically a side view of an image shifting element comprising a plurality of micro prisms.

Referring to FIG. 4a, The image shifting element 301a of the image merging element 300 may be implemented using a plurality of refracting prisms 320, such as microprisms arranged on a sheet material. A light ray LRa is bent by an angle $\alpha 1$ in the direction VX with respect to its original line of propagation OP. The angle $\alpha 1$ by which the light ray LRa is bent in the direction VX depends on the prism angle $\beta 1$ of the refracting prism, through which the ray LRa is transmitted.

Advantageously, the prism angles $\beta 1$ of all of the prisms 320 are equal. In that case the degree of bending of the light rays provided by the prisms 320 is substantially constant over the area of the image shifting elements.

The image shifting element 301a comprises a plurality of adjacent prisms. Advantageously, the image shifting element 301a comprises several hundreds or several thousands of prisms.

Thin, flexible and transparent sheet material comprising a plurality of microscopic prisms may be manufactured using molding or hot embossing techniques, based on plastic, glass or any other suitable optical material.

Such thin and flexible sheet material comprising microscopic prisms is available, for example, from a company 3M under a trade name Accentrim.

Advantageously, the image merging elements 301a, 301b may be cut from rolled sheet material. Advantageously, the material is cut parallel to the orientation of the prisms. As the material is, in the large scale, homogeneous there is minimum amount of wasted material after cutting. Further, work associated with alignment and positioning of cutting tools is minimized.

Figure 4B:
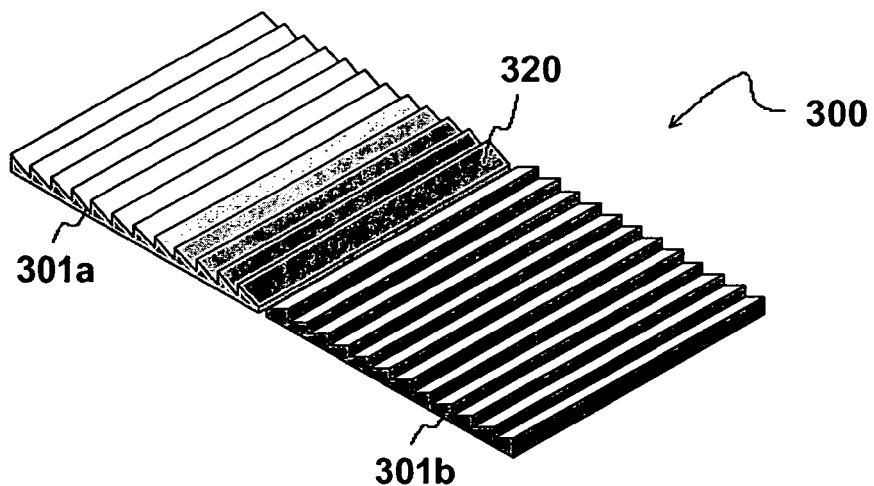
FIG. 4b shows schematically a three dimensional view of an image merging element comprising a plurality of prisms.

Referring to FIG. 4b, the prisms 320 of the image shifting elements 301a, 301b are substantially linear and substantially parallel with each other. Advantageously, the orientation of the prisms 320 is parallel to the gap between the first display unit 100a and the second display unit 100b.

Figure 5A:
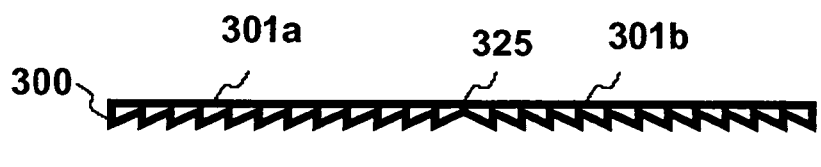
FIG. 5a shows schematically a side view of an image merging element comprising two image shifting elements.

Referring to FIG. 5a, the image merging element 300 may comprise the first image shifting element 301a and the second image shifting element 310b. There is an interface 325 between the first image shifting element 301a and the second image shifting element 30lb. A microprism sheet comprising such an interface 325 may be, for example, a product having trade name ACCENTRIM™ B200 microprism sheet by the company 3M.

Figure 5B:
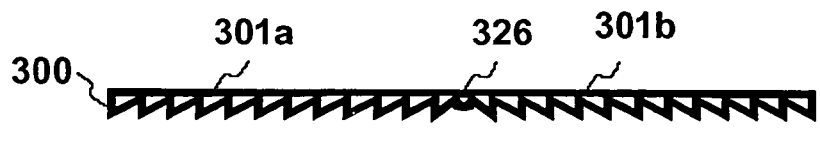
FIG. 5b shows schematically a side view of an image merging element comprising two image shifting elements, said image shifting elements being coupled together by a hinge.

Referring to FIG. 5b, the image merging element 300 may comprise a hinge 326 between the first image shifting element 301a and the second image shifting element 310b. The hinge 326 enables the image merging element 300 to be folded.

Figure 5C:
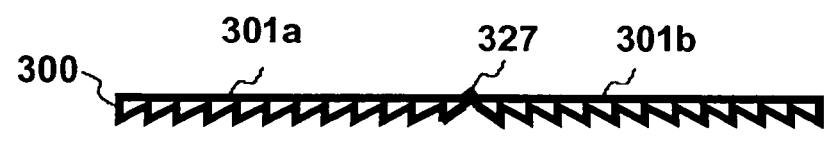
FIG. 5c shows schematically a side view of an image merging element comprising two image shifting elements, said elements being coupled together by an integrated hinge.

Referring to FIG. 5c, the image merging element 300 may comprise an integrated hinge. The integrated hinge may be a flexible hinge 327 between the first image shifting element 301a and the second image shifting element 301b. The flexible hinge may be implemented, for example, using a portion of plastic, rubber or fabric.

Figure 5D:
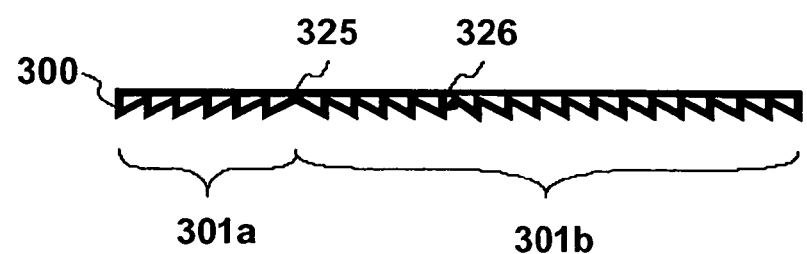
FIG. 5d shows schematically a side view of an image merging element comprising two image shifting elements, one of said image shifting elements being divided into two by a hinge.

Referring to FIG. 5d, the image merging element 300 may comprise a hinge 326, which divides the second image shifting element 301b into two parts. The position of the hinge 326 may be different from the position of the interface 325 between the first image shifting element 301a and the second image shifting element 301b.

Figure 6:
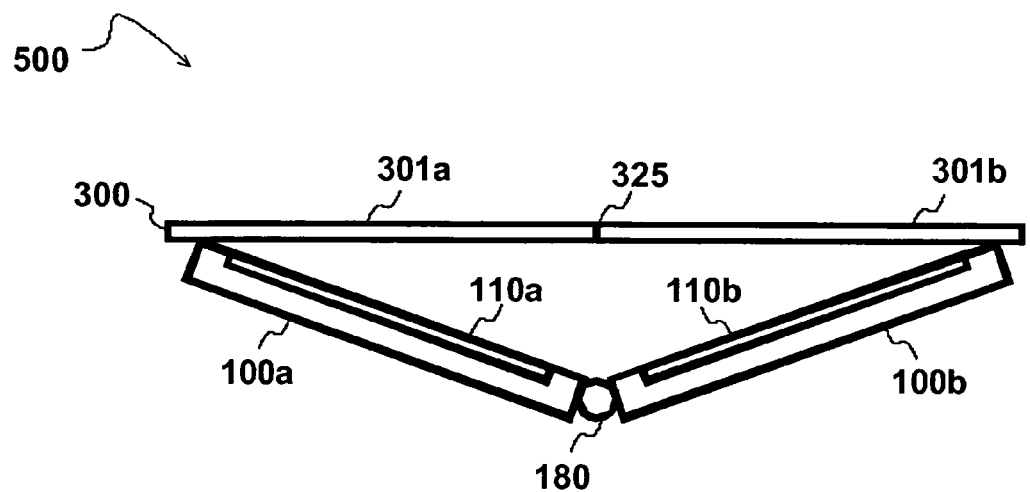
FIG. 6 shows schematically a side view of a display device comprising a detachable image merging element.
Figure 7:
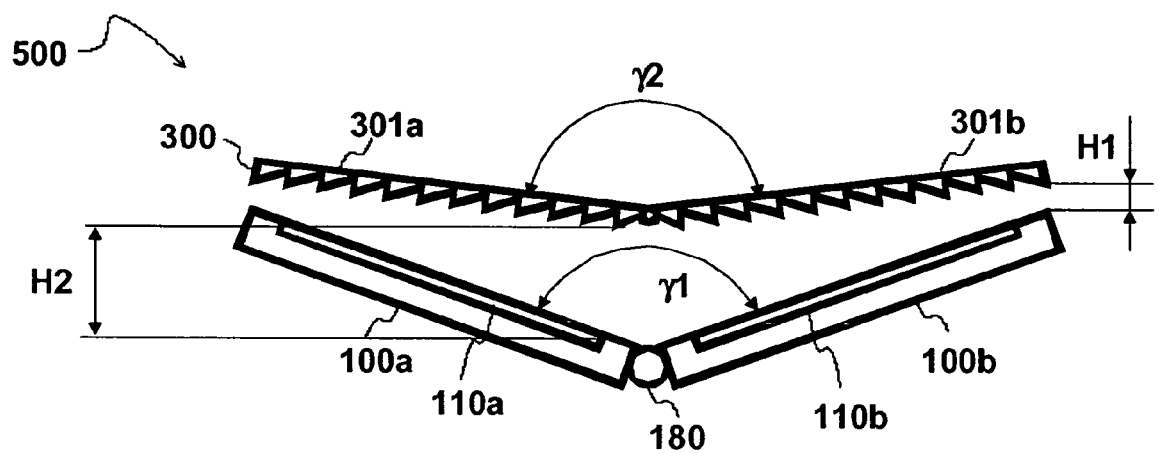
FIG. 7 shows schematically in a side view an angle between two image shifting elements and an angle between two display units.

Referring to FIG. 6, the image merging element 300 may be an detachable accessory to a display device 500. The image merging element 300 may be stiff, flexible or comprise hinges for folding. Referring to FIG. 7, the display device 500 may be foldable. Further, also the image merging element 300 may be foldable. The angle between the first image shifting element 301a and the second image shifting element 301b is $\gamma 2$. The angle between the first display unit 100a and the second display unit 100b is $\gamma 1$. The smallest vertical distance between an image shifting element 301a, 301b and an active region 110a, 110b is H1 and the greatest vertical distance between an image shifting element 301a, 301b and an active region 110a, 110b is H2. The distance H2 may be substantially greater than the distance H1. The distance H1 may also be close to zero.

The angle $\gamma 2$ may be smaller than the angle $\gamma 1$. The first active region 110a may not be parallel to the second active region 110b. The first active region 110a may not be parallel to the first image shifting element 301a.

Figure 8A:
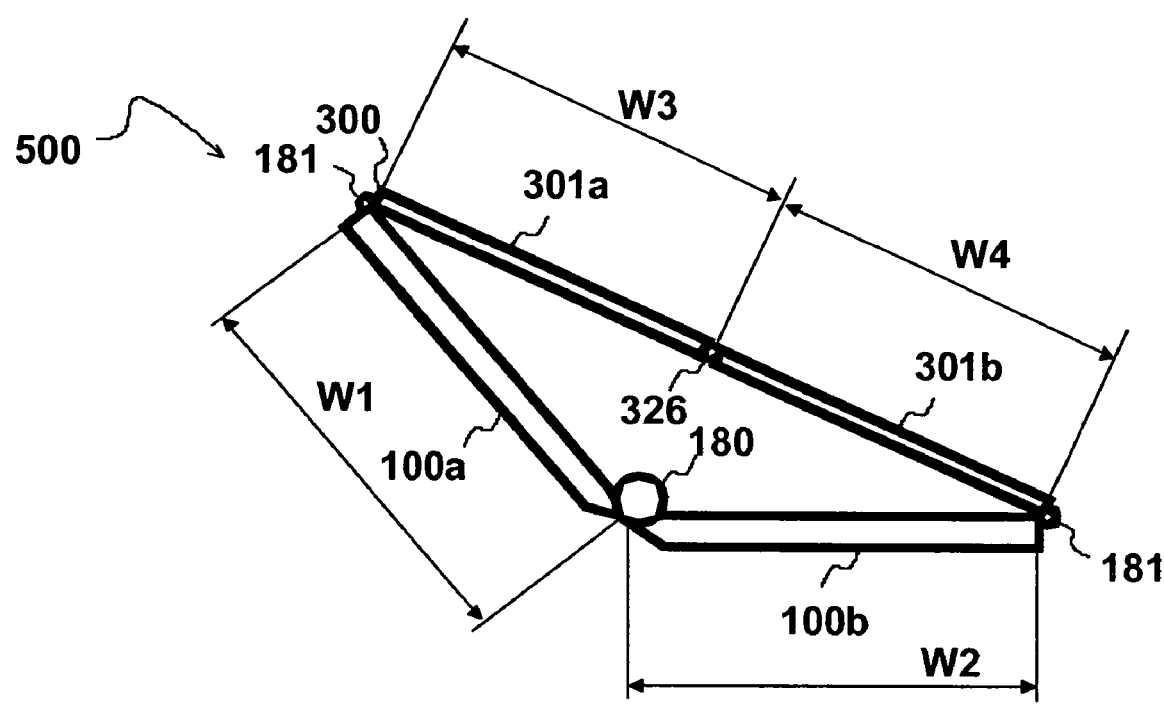
FIG. 8a shows schematically a side view of a foldable display device comprising a foldable image merging element, said display device being in a viewing state.

Referring to FIG. 8a, a foldable image merging element 300 may be coupled to a foldable display device 500 by hinges 181. FIG. 8a shows such a display device 500 is in an open viewing state.

The dimensions of the image shifting elements 301a, 301b, the dimensions of the display units 100a, 100b and the positions of the hinges 181 are advantageously selected such that the display device 500 may be folded together with the image merging element 300. One way to enable the folding is to arrange the image merging element 300 and the display units 100a, 100b in a triangular configuration, as shown in FIG. 8a.

Advantageously, a sum W1+W2 should be greater than a sum W3+W4, where W1 is the width of the first display unit 100a, W2 is the width of the second display unit 100b, W3 is the width of the first image shifting element 301 a, and W4 is the width of the second image shifting element 301b. This condition makes it possible to fold the image merging element 300 between the display units 100a, 100b, using a minimum number of hinges and moving components.

Figure 8B:
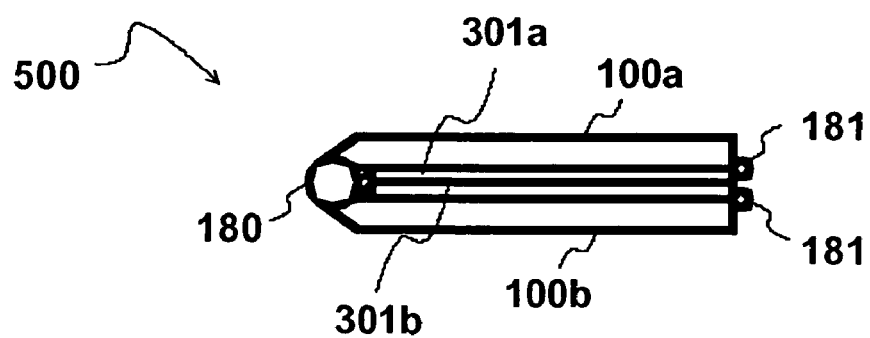
FIG. 8b shows schematically a side view of a foldable display device comprising a foldable image merging element, said display device being in a folded state.

FIG. 8b shows the display device 500 according to FIG. 8a in a closed, folded state. The image merging element 300 and the active regions 110a, 110b of the display units 110a, 110b are well protected in the closed state. The size of the display device 500 is smaller in the closed state than in the open state.

Figure 9:
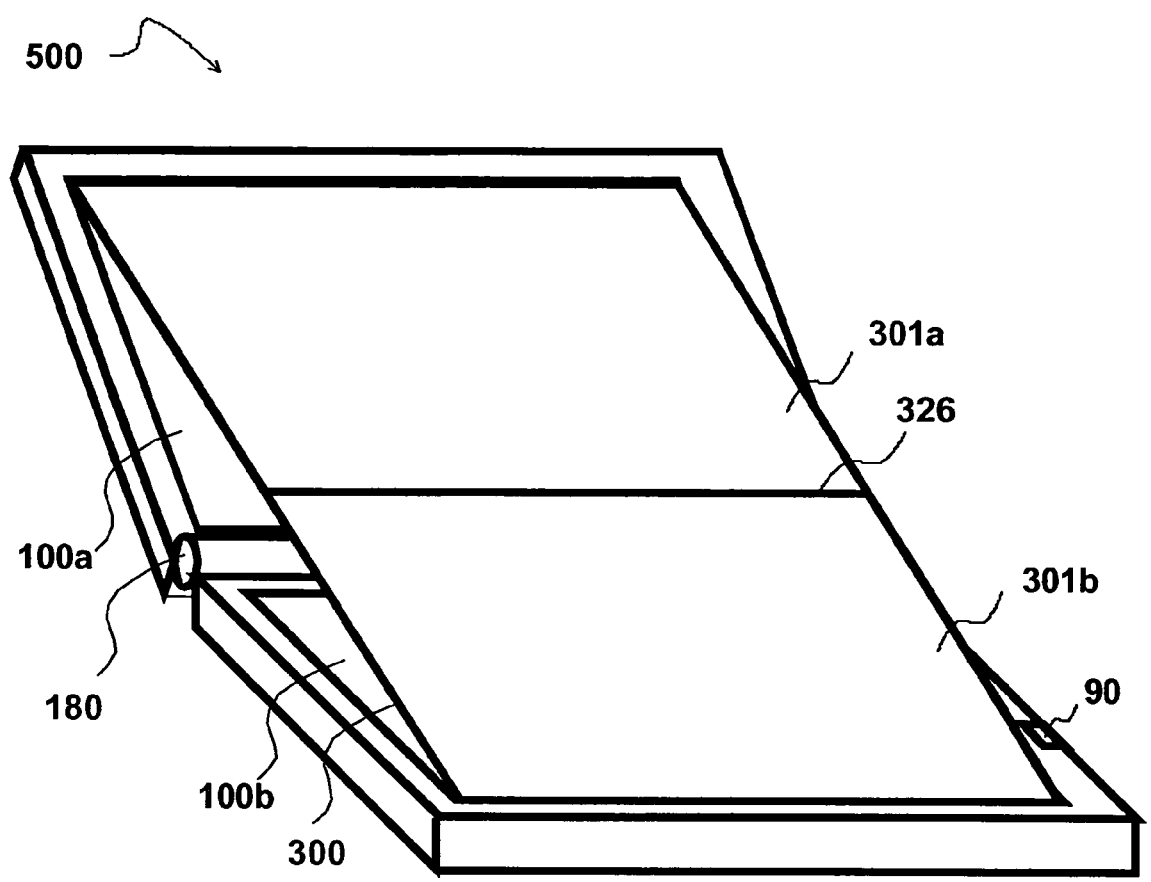
FIG. 9 shows schematically a three dimensional view of a foldable display device comprising two image shifting elements.

FIG. 9 shows a foldable display device 500 comprising an image merging element 300. The display device 500 may further comprise an user interface 90 to receive commands from a user. The user interface 90 may be e.g. a push button, keyboard, proximity detector or a voice-controlled interface. The interface 90 may be used to change or scroll the displayed images. The displayed image may be e.g. a page of text. The user interface 90 may be used to adjust the positions of the primary images 10a, 10b on the displays. The user interface 90 may be used to adjust the positions of the primary images 10a, 10b to eliminate the gap between the secondary images 20a, 20b. The user interface 90 may be used to deform the primary images 10a, 10b to adjust the form of the secondary images 20a, 20b (This aspect will be discussed later referring to FIGS. 13a-14b).

Figure 10A:
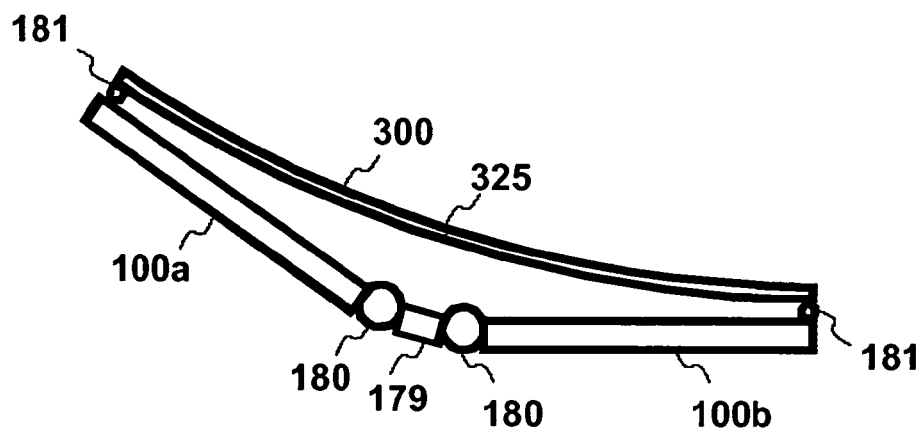
FIG. 10a shows schematically a side view of a foldable display device comprising a flexible image merging element, said display device being in an intermediate viewing state.

Referring to FIG. 10a, the image merging element 300 may be flexible. There may be a viewing state in which the form of the image merging element 300 deviates from a planar form. The image merging element 300 may be curved. The display device 500 may comprise an intermediate part 179 and a further hinge 180 to provide more internal space in the closed state.

Figure 10B:
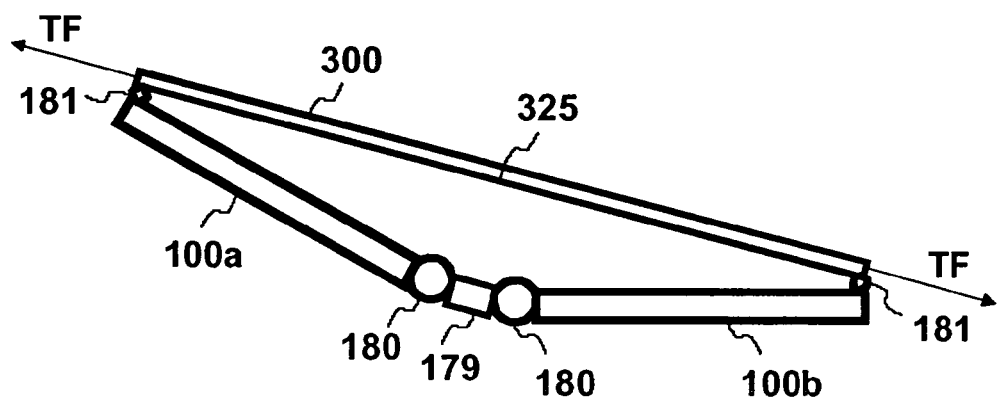
FIG. 10b shows schematically a side view of a foldable display device comprising a flexible image merging element, said display device being in a fully open viewing state.

Referring to FIG. 10b, the flexible image merging element 300 may be tensioned to a planar form by pulling its edges by forces TF. The hinges 180 may incorporate a spring mechanism to generate the forces TF.

Figure 10C:
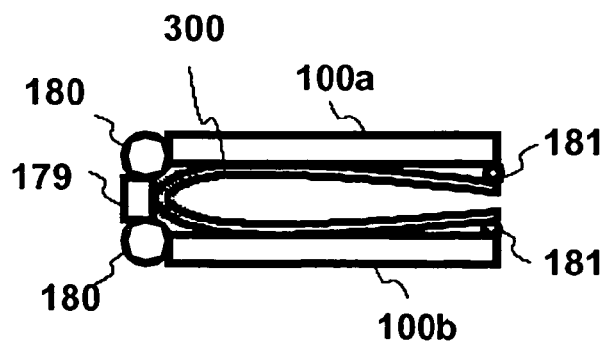
FIG. 10c shows schematically a side view of a foldable display device comprising a flexible image merging element, said display device being in a folded state.

Referring to FIG. 10c, the flexible image merging element 300 shown in FIG. 10a allows the display device 500 to be folded. Advantageously, the display device 500 comprises a bistable spring mechanism to keep the display device 500 either in the closed state or in the fully open state, as shown in FIG. 10b.

Figure 11:
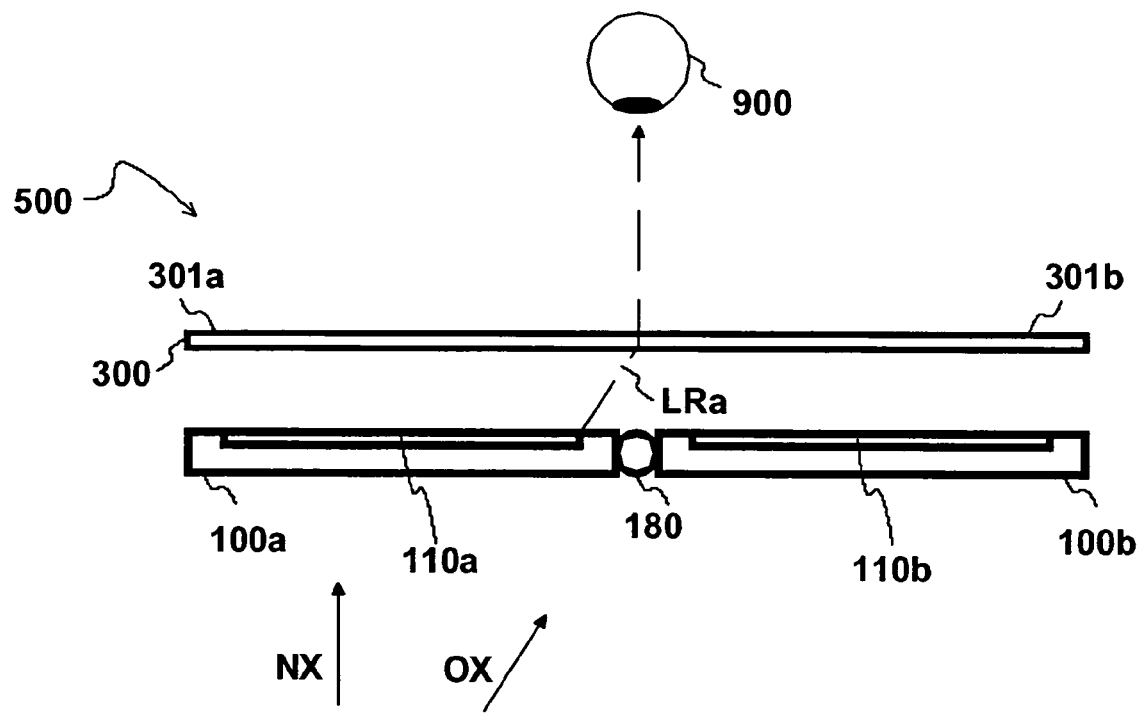
FIG. 11 shows schematically in a side view a light ray impinging on an observer's eye.

Referring to FIG. 11, the light transmitted by the active regions 110a, 110b has an angular intensity distribution. The active regions 110a, 110b are advantageously adapted to transmit light substantially into a direction which maximizes the brightness of the perceived image. For example, in the situation shown in FIG. 11, the maximum intensity of the light transmitted by the active region 110a should be directed in the direction OX. Light transmitted by the active region 110a in directions other than OX, for example in the direction NX, do not reach the eye 900 of the observer and is substantially wasted.

The optimum direction of transmitted light depends on the relative position of the eye 900 of the observer with respect to the active regions 110a, 110b and also on the properties of the image shifting element 301a, 301b between the active regions 110a, 110b and the eye 900 of the observer.

The display units 100a, 100b may be implemented, for example, using backlit liquid crystal displays. Such displays exhibit an angular intensity distribution, which is advantageously optimized to maximize the brightness of the displayed image.

Figure 12:
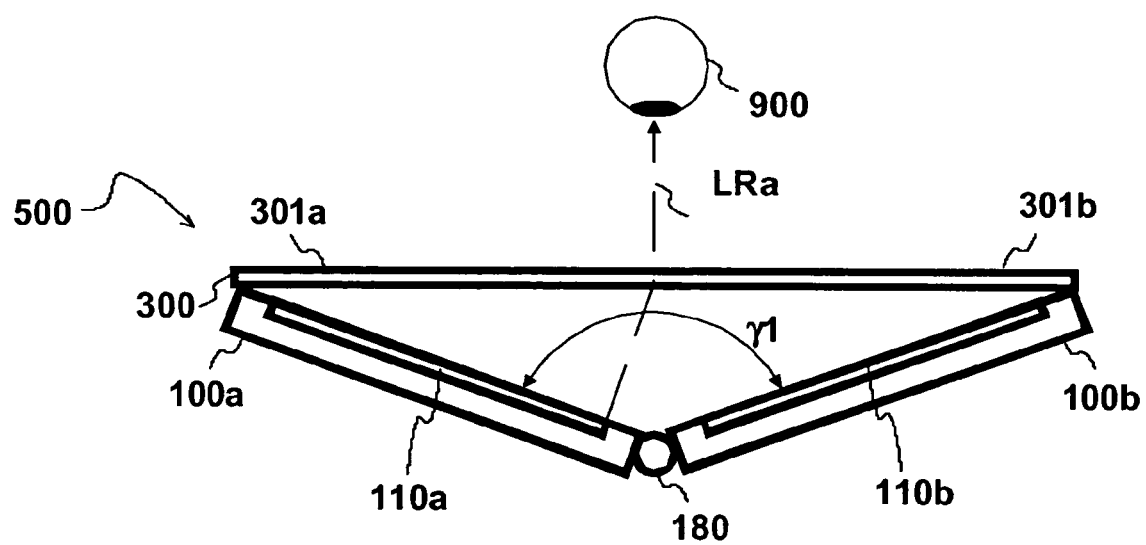
FIG. 12 shows schematically in a side view an angle between two display units.

Referring to FIG. 12, the angle γ1 between the display units 100a, 110b may be adjustable. In order to maximize the apparent brightness of the displayed secondary images 20a, 20b, It may be advantageous to adjust and/or optimize the angular intensity distribution according to the angle γ1 and according to the applied image merging element 300.

Figure 13A:
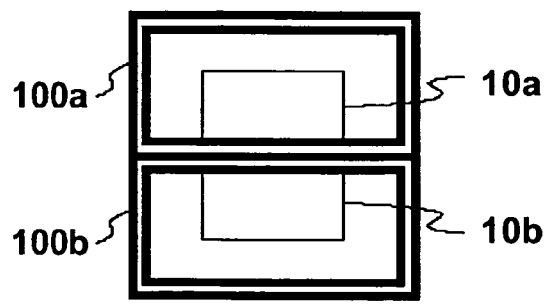
FIG. 13a shows schematically in a top view two rectangular primary images displayed by two display units.

Referring to FIG. 13a, the first display unit 100a displays a first primary image 10a and the second display unit 100b displays a second primary image 10a. In FIG. 13a, the primary images 10a, 10b are halves of a square.

Figure 13B:
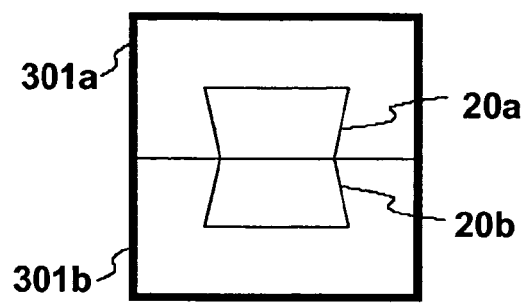
FIG. 13b shows schematically in a top view secondary images formed by two image shifting elements, corresponding to the primary images shown in FIG. 13a, FIG. 14a shows schematically in a top view two distorted primary images displayed by two display units.

It is assumed in FIG. 13b, that the angle γ1 between the display units 100a, 100b is substantially smaller than 180 degrees. Thus, the distance between the eye 900 of the observer and the display units 100a, 100b is greater near the inner sides than at the outer sides of the active regions 110a, 110b. Therefore the secondary images 20a, 20b formed by the image shifting elements 301a, 301b appear to be deformed. The combined image formed by the secondary images 20a, 20b is not a perfect square but slightly resembles the form of an hourglass.

Figure 14A:
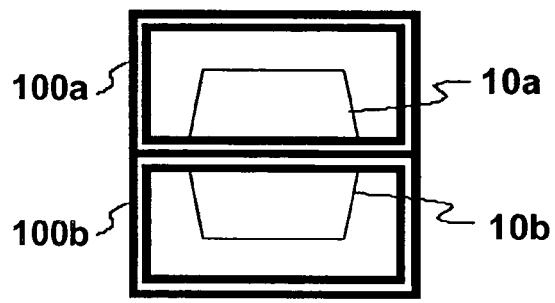
FIG. 14b shows schematically in a top view secondary images formed by two image shifting elements, corresponding to the primary images shown FIG. 14a, FIG. 15 shows schematically a side view of an image shifting element adapted to shift light rays.
Figure 14B:
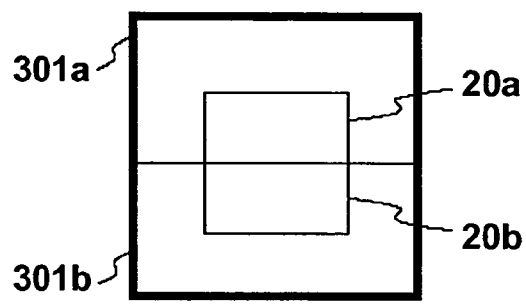

Referring to FIG. 14a, the effect shown in FIG. 13b may be compensated by deforming the primary images 10, 10b such that the secondary images 20a, 20b appear to form a perfect square, as shown in FIG. 14b.

Figure 15:
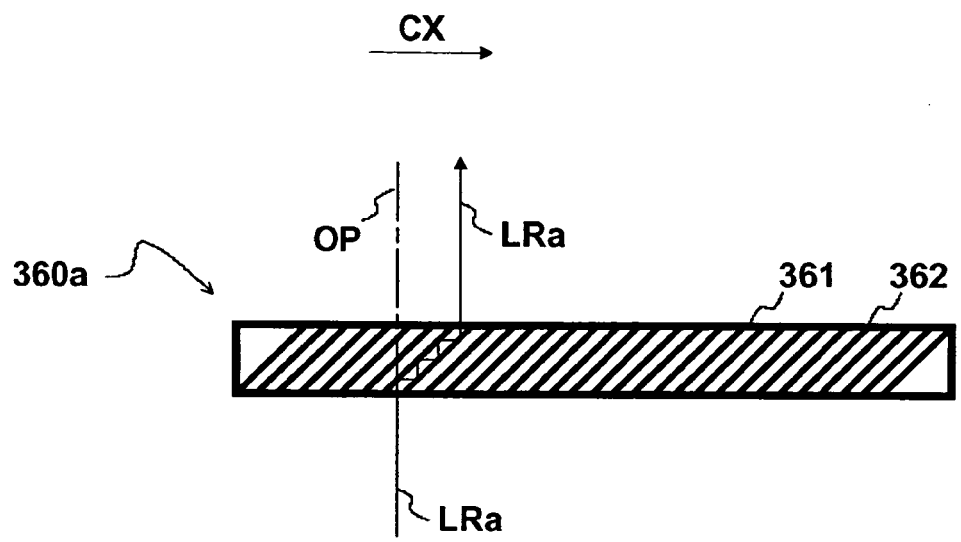

Referring to FIG. 15, the image merging element may also comprise an image shifting element 360a, which is adapted to shift the paths of light rays LRa. An image shifting element 360 may be implemented, for example, by sandwiching a plurality of inclined transparent layers 361 and reflective layers 362. Light rays LRa are transmitted through the transparent layers 361 and are consequently shifted in the direction CX by reflections between adjacent reflective layers 362. The transmitted portion of a light ray LRa may remain substantially parallel to the original direction OP of the light ray LRa.

Figure 16:
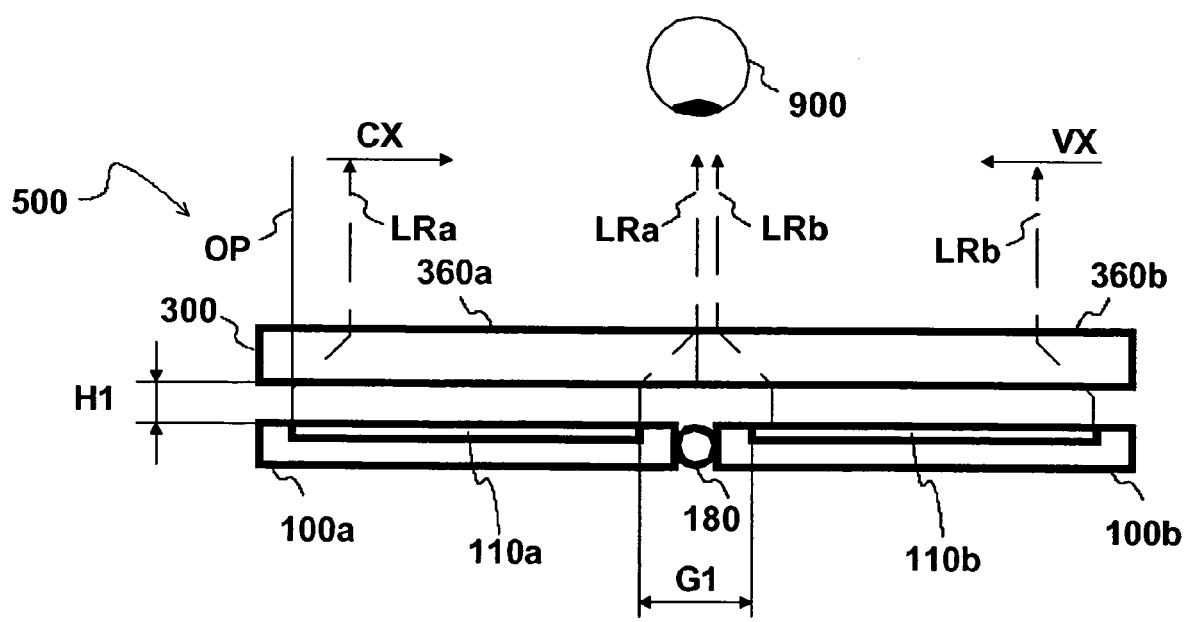
FIG. 16 shows schematically a side view of a display device comprising two image shifting elements, said image shifting elements being adapted to shift light rays.

Referring to FIG. 16, The image merging element 300 may comprise two image shifting elements 360a, 360b, which are adapted to shift the paths of the light rays LRa, LRb. In order to merge the formed secondary images 20a, 20b, the first image shifting element 360a shifts light rays LRa in the direction CX. The second image shifting element 360b shits light rays LRb in the direction VX.

Figure 17:
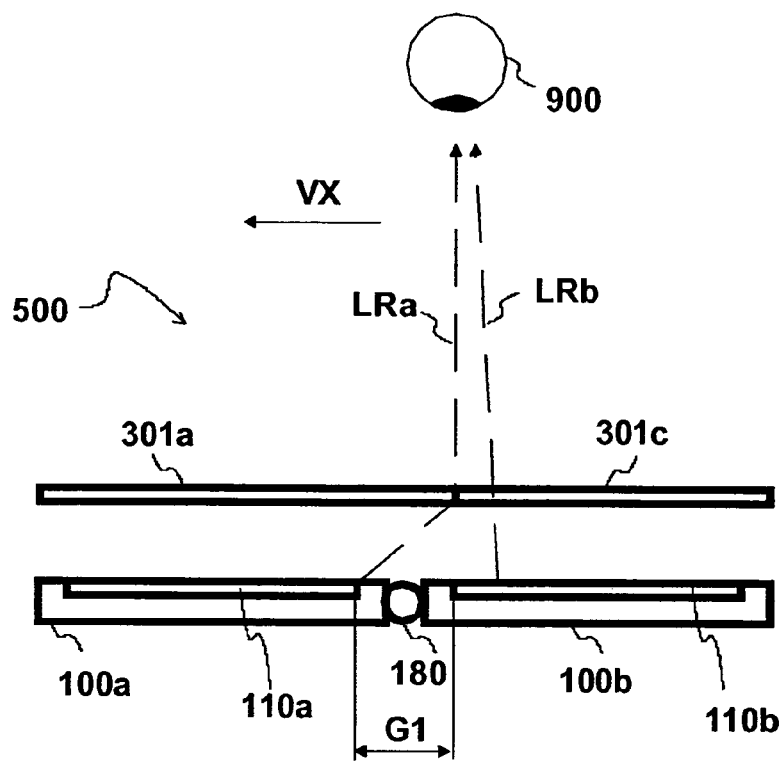
FIG. 17 shows schematically a side view of a display device comprising only one image shifting element.

Referring to FIG. 17, the image merging element 300 may comprise a first image shifting element 301a and a window 301c. The window 301c does not cause substantial bending and/or shifting of light rays LRb. The first active region 110a forms a first primary image 10a. The first image shifting element 301a forms a secondary image 20a based on the first primary image 10a. The secondary image 20a is substantially near a primary image 10b formed by the second active region 110b.

Thus the images may be substantially merged using only one image shifting element 301a.

Figure 18:
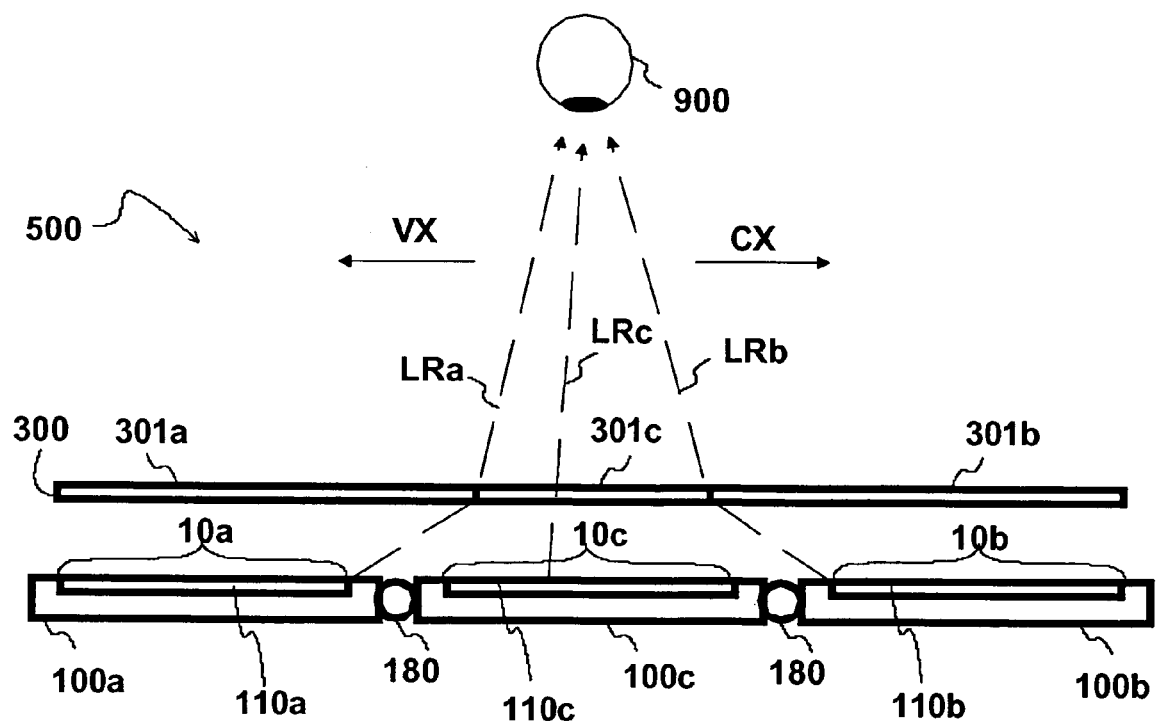
FIG. 18 shows schematically a side view of a display device comprising three display units.
Figure 19:
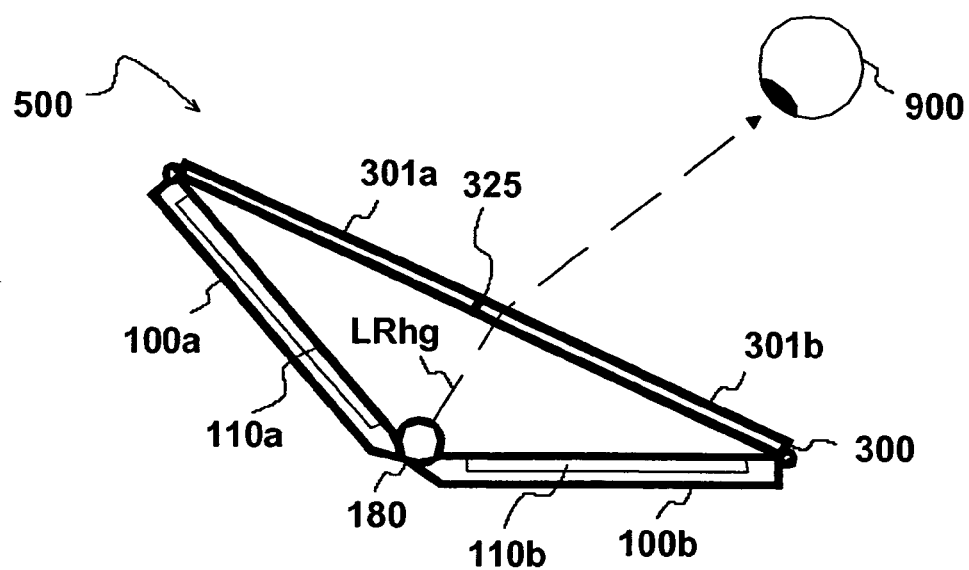
FIG. 19 shows schematically in a side view the effect of an incorrect viewing position.

Referring to FIG. 18, the display device 500 may comprise three display units 100a, 100b, 100c with respective active regions 110a, 110b, 110c. The display units 100a, 100b, 100c may be joined together by hinges 180. The display device 500 may comprise an image merging element 300 which comprises the first image shifting element 301a, the second image shifting element 301b and a window element 301c. The first image shifting element 301a forms a first secondary image 20a based on a first primary image 10a formed by the first active region 110a. The second image shifting element 301b forms a second secondary image 20b based on a second primary image 10b formed by the second active region 110b. The light rays LRa, LRb are bent and/or shifted such that the secondary images 20a, 20b are substantially near the third primary image 10c formed by the third, central active region Referring to FIG. 19, it is important that observer's eye 900 is in a correct position with respect to the display device 500. When the eye 900 of the observer is in a wrong position, he may see the inactive areas of the display units and/or the hinge 180.

For example, the path of the ray LRhg, originating form the hinge 180, intercepts the eye 900 of the observer. The situation may be remedied by moving the eye 900 or by turning the display device 500.

It is important that the both eyes of an observer are aligned with the interface 325 between the first image shifting element 301a and the second image shifting element 301b. In other words, a line passing through the eyes should be parallel to the interface 325 between the image shifting elements 301a, 301b.

Figure 20:
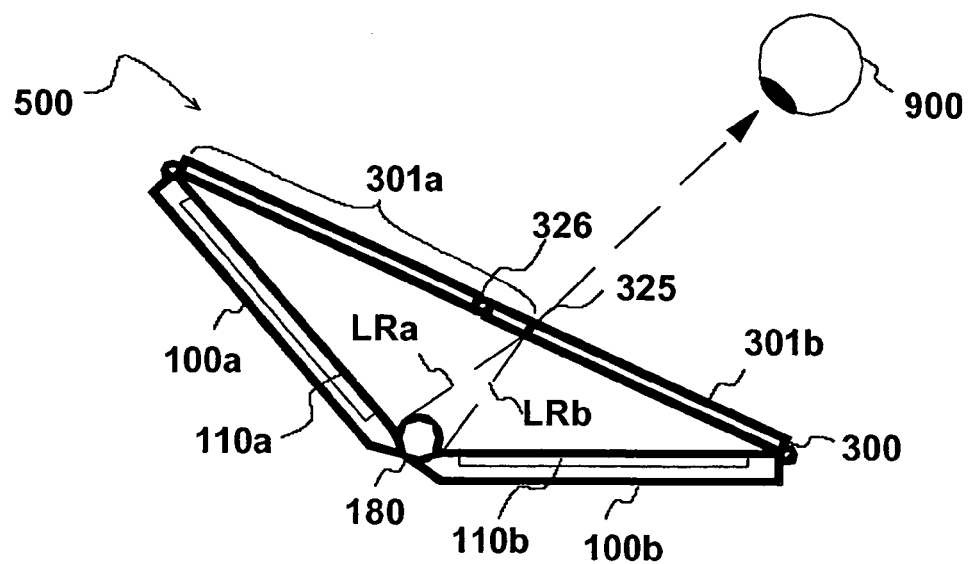
FIG. 20 shows schematically in a side view a possible position of an element interface.

Referring to FIG. 20, the position of the interface 325 between the image shifting elements 301a, 310b may be selected to prevent the observer from seeing the hinge 180 and the inactive areas. The position of the interface 325 may be different from the position of the hinge 326 between the image shifting elements 301a, 310b.

Figure 21A:
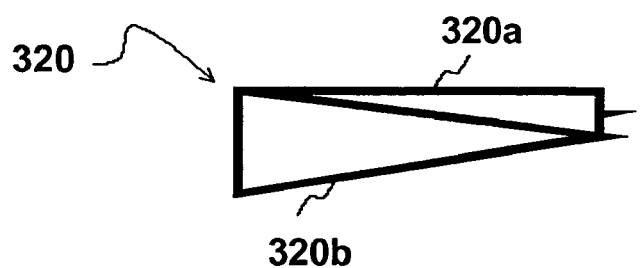
FIG. 21a shows schematically a side view of a an achromatic prism.
Figure 21B:
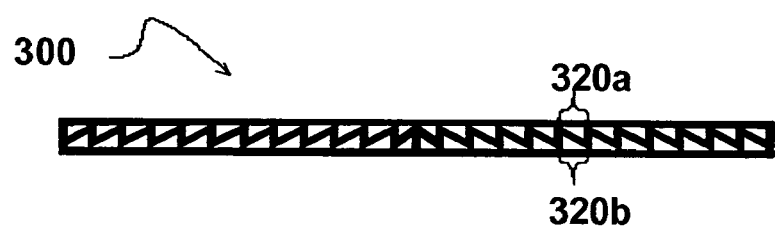
FIG. 21b shows schematically in a side view an image merging element comprising a plurality of achromatic prisms.

Referring to FIG. 21a, prisms made of one material only may cause chromatic dispersion of refracted light. An achromatic prism assembly 320 may be constructed by combining two prisms 320a, 320b of optically different materials. The materials are advantageously selected such that chromatic dispersion caused by the prism 320a substantially compensates the chromatic dispersion caused by the prism 320b at predetermined design wavelengths. An image merging element based on achromatic prisms may be constructed, as shown in FIG. 21b.

The display unit 100a, 100b may be implemented using any suitable display technology, for example reflective, emissive or transmissive light modulating array. The display unit 100a, 100b may be based on light emitting diodes (LED or Organic Light Emitting Diode), micromechanical mirrors (also known as a DMD display, digital micromirror device, or MEMS display) or an array of liquid crystal cells. The image shifting element 301a, 301b may also be implemented using one or more diffractive gratings.

The display device 500 may be a mobile phone, a communicator or a personal digital assistant (PDA) device, for example. The display device 500 may be an electronic book. The device 500 may comprise wireless communication capabilities. The device 500 may comprise means to connect to the internet.

The display device 500 may be assembled using separate devices. E.g. two mobile phones may be positioned adjacent to each other, and separate primary images 10a, 10b displayed by the display units of said phones may be merged together using an image merging element 300.

For any person skilled in the art, it will be clear that modifications and variations of the devices and the method according to the present invention are perceivable. The particular embodiments described above with reference to the accompanying drawings are illustrative only and not meant to limit the scope of the invention, which is defined by the appended claims.

What is claimed is:

1. A display device for displaying an image, comprising at least:
a first display unit of a first width having a first active region to display a first primary image,
a second display unit of a second width having a second active region to display a second primary image, said second active region and first active region being adjacent to each other but having a gap between them, and
an image merging element adapted to form a first secondary image based on said first primary image and a second secondary image based on said second primary image,
wherein said image merging element comprises at least a first image shifting element of a third width adapted to shift and/or bend paths of light rays originating from said first primary image substantially in a first direction only in order to change a visual distance between said first secondary image and said second secondary image wherein said image merging element further comprises a second image shifting element of a fourth width adapted to shift paths of light rays originating from said second primary image substantially in a second direction only in order to change the visual distance between said first secondary image and said second secondary image, said second direction being substantially opposite to said first direction wherein a sum of the first width and the second width is greater than a sum of the third width and the fourth width so as to make the image merging element foldable between the first display unit and the second display unit in moving to a closed state from a viewing state in which the image merging element, the first display unit and the second display unit are arranged in a triangular configuration, wherein the triangular configuration comprising a first side is the first display unit, a second side is the second display unit, and a third side is the image merging element.

2. The display device according to claim 1, wherein an area of the first image shifting element is at least 51% of an entire area of the first active region, and an area of the second image shifting element is at least 51% of an entire area of the second active region.

3. The display device according to claim 1, wherein local optical magnification provided by said first image shifting element is substantially constant over the area of said first image shifting element.

4. The display device according to claim 1, wherein a degree of shifting, bending, or both, caused by the image shifting element is substantially constant over the area of said first image shifting element.

5. The display device according to claim 1, wherein said first image shifting element is implemented using a plurality of substantially linear and parallel prisms.

6. The display device according to claim 5, wherein said first image shifting element is a microprism sheet.

7. The display device according to claim 5, wherein prism angles of said prisms are substantially equal.

8. The display device according to claim 1, wherein said image merging element is flexible.

9. The display device according to claim 8, wherein said image merging element is adapted to be held in planar form by a tensioning force.

10. The display device according to claim 1, wherein said device is a foldable device.

11. The display device according to claim 10, wherein an angular intensity distribution of light transmitted by said first display unit is optimized according to a predetermined viewing direction.

12. The display device according to claim 10, wherein an angular intensity distribution of light transmitted by said first display unit is adapted to be adjusted according to an angle between said first display unit and said second display unit.

13. The display device according to claim 1, wherein a distance between said first primary image and said second primary image is adjustable.

14. The display device according to claim 1, wherein an angle between said first display unit and said second display unit is substantially smaller than one hundred and eighty degrees.

15. The display device according to claim 1, wherein said device further comprises a third display unit comprising a third active region to display a third primary image.

16. A mobile device comprising a display device for displaying an image, said display device in turn comprising at least:
a first display unit of a first width having a first active region to display a first primary image,
a second display unit of a second width having a second active region to display a second primary image, said second active region and first active region being adjacent to each other but having a gap between them, and
an image merging element adapted to form a first secondary image based on said first primary image and a second secondary image based on said second primary image,
wherein said image merging element comprises at least
a first image shifting element adapted to shift, or to bend, or to both shift and bend paths of light rays originating from said first primary image substantially in a first direction only in order to change a visual distance between said first secondary image and said second secondary image, and
a second image shifting element of a fourth width adapted to shift, or to bend, or to both shift and bend paths of light rays originating from said second primary image substantially in a second direction only in order to change a visual distance between said first secondary image and said second secondary image, said second direction being substantially opposite to said first direction wherein said image merging element further comprises a second image shifting element of a fourth width adapted to shift paths of light rays originating from said second primary image substantially in a second direction only in order to change the visual distance between said first secondary image and said second secondary image, said second direction being substantially opposite to said first direction wherein a sum of the first width and the second width is greater than a sum of the third width and the fourth width so as to make the image merging element foldable between the first display unit and the second display unit in moving to a closed state from a viewing state in which the image merging element, the first display unit and the second display unit are arranged in a triangular configuration, wherein the triangular configuration comprising a first side is the first display unit, a second side is the second display unit, and a third side is the image merging element.

17. The mobile device according to claim 16, wherein said first image shifting element and said second image shifting element are implemented using a plurality of substantially linear and parallel prisms, the prism angles of said prisms being substantially equal.

18. The mobile device according to claim 16, wherein said device is a foldable device.

19. The mobile device according to claim 18, wherein an angular intensity distribution of light transmitted by said first display unit is adjustable according to an adjustable angle between said first display unit and said second display unit.

20. The mobile device according to claim 16, wherein a distance between said first primary image and said second primary image is adjustable.

21. The mobile device according to claim 16, wherein an angle between said first display unit and said second display unit is substantially smaller than one hundred and eighty degrees.

22. A method to display an image, said method comprising:
transmitting light rays from a first active region of a first display unit of a first width to display a first primary image,
transmitting light rays from a second active region of a second display unit of a second width to display a second primary image, said second active region and first active region being adjacent to each other but having a gap between them,
using an image merging element to form a first secondary image based on said first primary image and a second secondary image based on said second primary image, said image merging element comprising at least a first image merging element of a third width, and shifting, or bending, or both shifting and bending paths of the light rays originating from said first primary image substantially in only a first direction by said first image shifting element in order to change a visual distance between said first secondary image and said second secondary image further comprising shifting or bending, or both shifting and bending paths of the light rays originating from said second primary image substantially in only a second direction by a second image shifting element of a fourth width in order to change a visual distance between said first secondary image and said second secondary image, said second direction being substantially opposite to said first direction wherein said image merging element further comprises a second image shifting element of a fourth width adapted to shift paths of light rays originating from said second primary image substantially in a second direction only in order to change the visual distance between said first secondary image and said second secondary image, said second direction being substantially opposite to said first direction wherein a sum of the first width and the second width is greater than a sum of the third width and the fourth width so as to make the image merging element foldable between the first display unit and the second display unit in moving to a closed state from a viewing state in which the image merging element, the first display unit and the second display unit are arranged in a triangular configuration, wherein the triangular configuration comprising a first side is the first display unit, a second side is the second display unit, and a third side is the image merging element.

23. The method according to claim 22, wherein substantially all light rays constituting the first secondary image are shifted, bent, or both substantially to a same extent.

24. The method according to claim 22, wherein said first image shifting element is implemented using a plurality of substantially linear and parallel prisms.

25. The method according to claim 24, wherein prism angles of said prisms are substantially equal.

26. The method according to claim 22, wherein said image merging element is flexible and is held in planar form by tension.

27. The method according to claim 22, further comprising selecting an angular intensity transmitted by said first display unit to optimize an apparent brightness of said first secondary image in a predetermined viewing direction.

28. The method according to claim 22, further comprising adjusting an angular intensity distribution of light transmitted by said first display unit according to an angle between said first display unit and said second display unit.

29. The method according to claim 22, further comprising adjusting a distance between said first primary image and said second primary image.

* * * * *